United States Patent [19]
Gabillet

[11] Patent Number: 4,988,259
[45] Date of Patent: Jan. 29, 1991

[54] MODULAR MANIPULATION ARM

[76] Inventor: Maurice Gabillet, 146 rue du Château, 92100 Boulogne-Billancourt, France

[21] Appl. No.: 317,513

[22] Filed: Mar. 1, 1989

[30] Foreign Application Priority Data

Mar. 7, 1988 [FR] France ............................... 88 02860

[51] Int. Cl.$^5$ ............................................. B25J 17/00
[52] U.S. Cl. ................................... 414/729; 74/479; 294/88; 901/22; 901/28
[58] Field of Search .......................... 414/729; 74/479; 92/121; 294/88; 901/28, 29, 22

[56] References Cited

U.S. PATENT DOCUMENTS

| | | |
|---|---|---|
| 4,552,504 | 11/1985 | Nakada et al. . |
| 4,561,816 | 12/1985 | Dingess . |
| 4,641,251 | 2/1987 | Inoue . |
| 4,665,558 | 5/1985 | Burke ................................. 92/121 X |
| 4,683,406 | 7/1987 | Ikeda et al. ........................ 901/28 X |

FOREIGN PATENT DOCUMENTS

| | | |
|---|---|---|
| 0153884 | 9/1985 | European Pat. Off. . |
| 2101097 | 3/1972 | France . |
| 2150635 | 4/1973 | France . |
| 2126559 | 3/1984 | United Kingdom . |

Primary Examiner—Robert J. Spar
Assistant Examiner—Donald W. Underwood
Attorney, Agent, or Firm—A. W. Breiner

[57] ABSTRACT

A modular manipulation arm formed from successive elements, each of which can pivot relative to the preceding one about a pivot axis coinciding with the axis of the element in question, and can pivot relative to the following one about a pivot axis which meets the axis of the element in question obliquely. These pivotings are obtained by means of rotary jacks which cause a driveshaft portion to rotate relative to the corresponding element and which immobilize it in the selected position. The jacks are each associated with a distributor, itself preferably controlled by a low-power electric motor. The connection between successive elements preferably comprises a cardan joint linking the elements and oblique bearing surfaces at the end of the driveshaft portions.

9 Claims, 3 Drawing Sheets

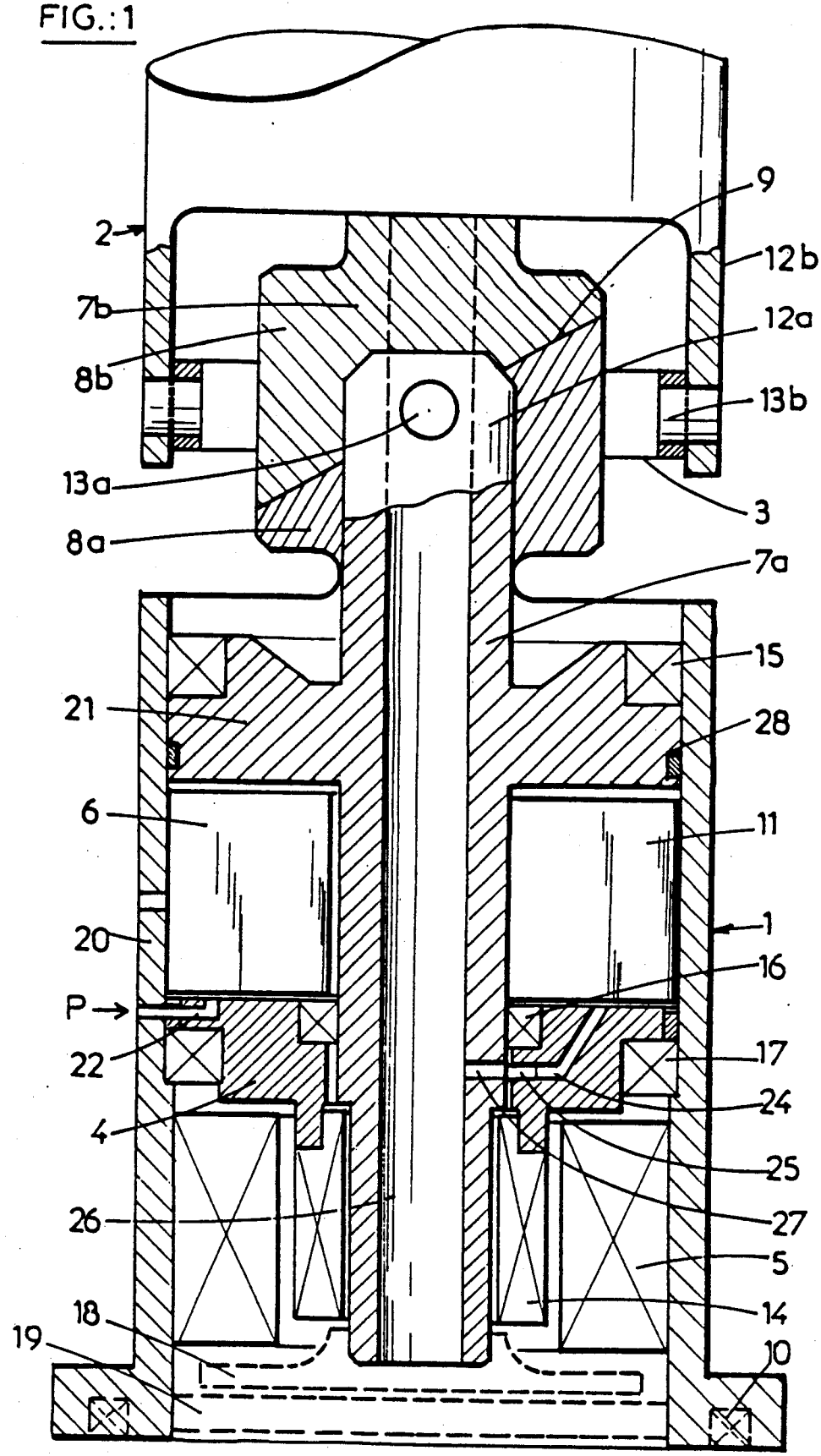
FIG.:1

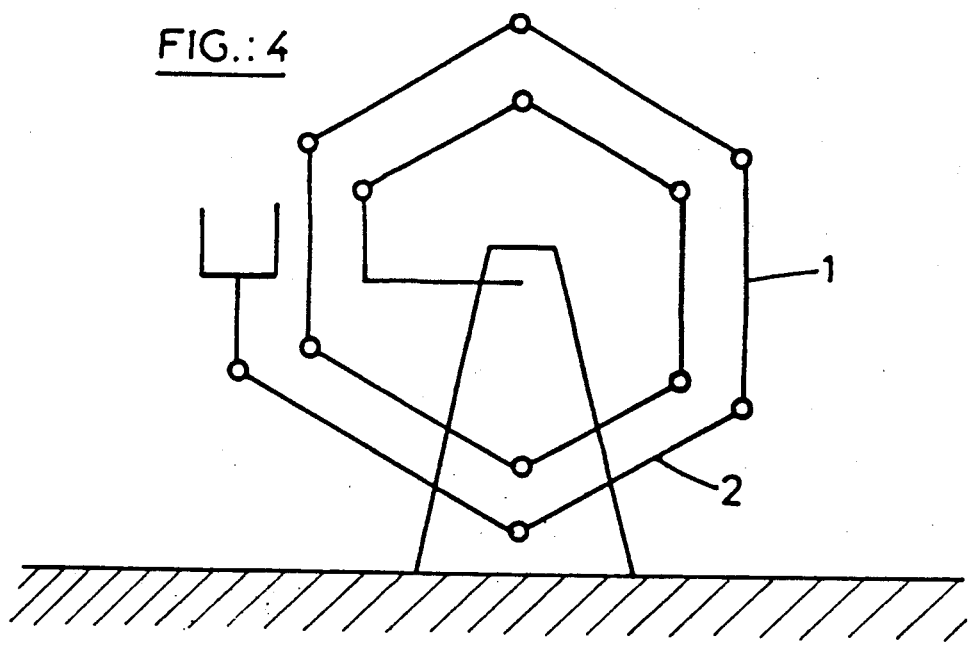
FIG.: 4
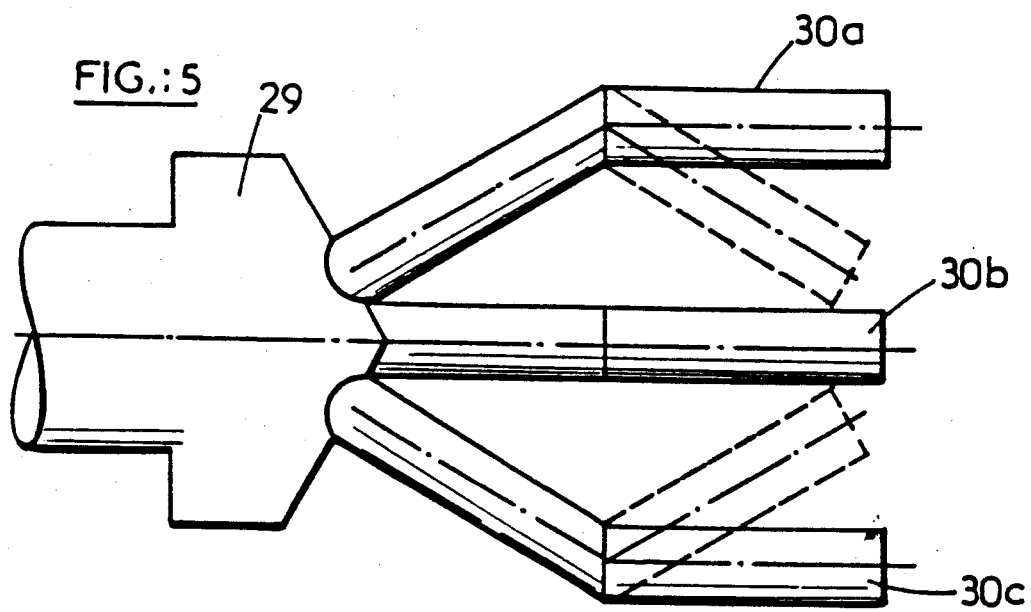
FIG.: 5

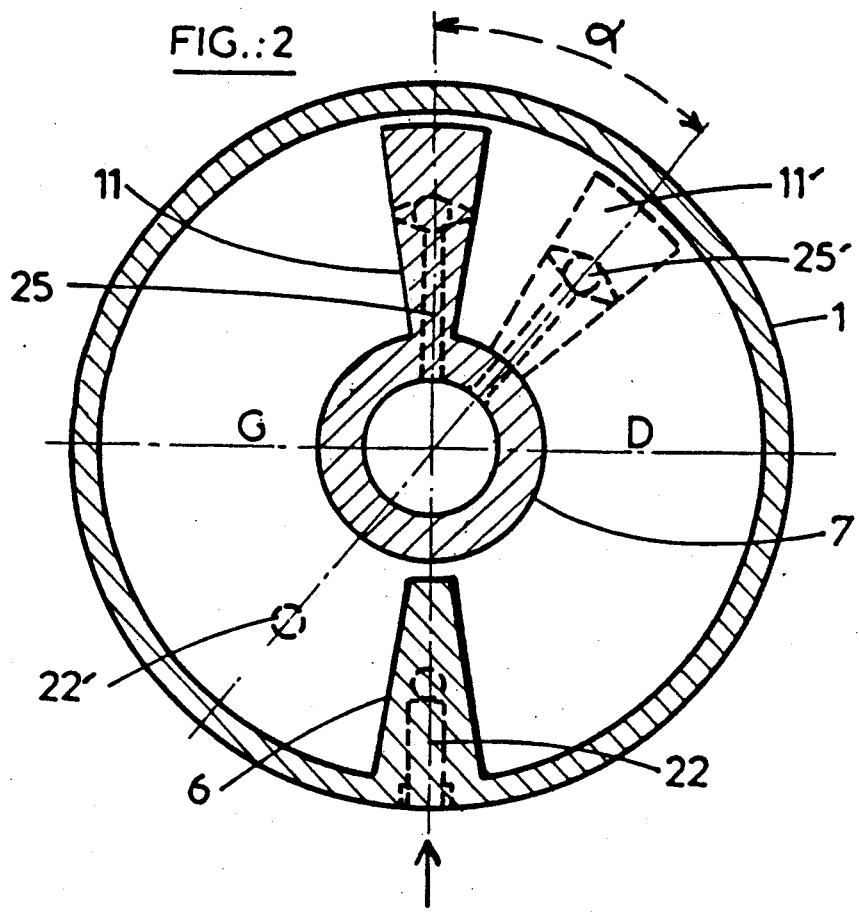
FIG.:2
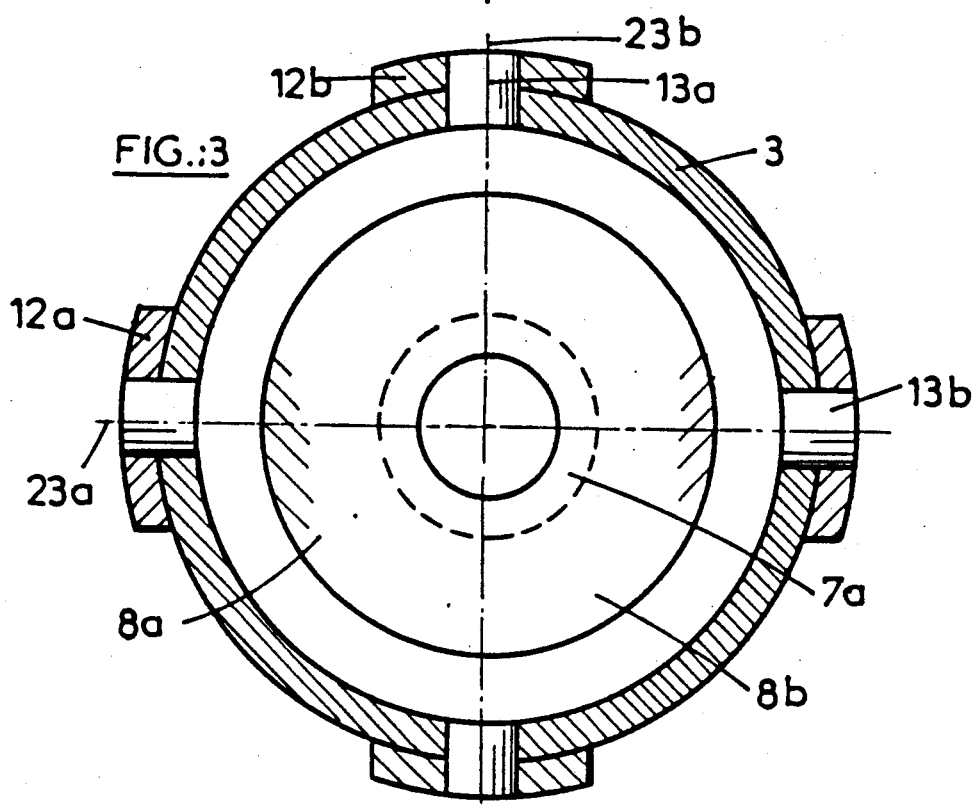
FIG.:3

MODULAR MANIPULATION ARM

The present invention relates to a modular manipulation arm.

In the document EP-A-0,153,884, the inventor described a manipulation arm comprising a series of articulated elements, a successive first and second element of the series each having one axis and being linked to one another by a coupling means allowing the first element to pivot about a pivot axis which meets the axis of the first element and which meets the axis of the second element obliquely at the same point.

The said first and second elements each having a rigid drive-shaft portion within and coaxial relative to the corresponding element, these portions being linked to one another by means of an articulated connection and each being linked to the corresponding element by connection means which make it possible to rotate a portion at will and immobilize it at will in relation to the corresponding element.

According to this document, the driving means can comprise either a crank device common to all the elements of the manipulation arm and controlling the rotation of the articulated drive shaft composed of the successive shaft portions linked in series to one another, these portions each being equipped with a clutch for obtaining at will the relative rotation of the element in relation to the shaft, or a motor equipped with gears and associated with each element.

It emerged that, in both cases, the result of achieving high forces for the manipulation arm was a considerable increase in the weight and dimensions of the apparatus.

The object of the invention is to provide a manipulation arm of the abovementioned type which is capable of supplying high forces in comparison with its weight and its bulk, whilst at the same time being of simple and inexpensive construction.

This result is obtained by providing that the driving means and the immobilizing means comprise a rotary jack, of which one cylindrical wall and one axial wall are fixed to the element, the other cylindrical wall and the other axial wall being fixed to the shaft portion, and a distributor capable of connecting a chamber of the rotary jack to a source of pressurized fluid or to a pressure discharge means and of isolating the said chamber.

The rotary jack is an appliance known for a long time. It comprises an enclosure delimited by an outer cylindrical wall and an inner cylindrical wall coaxial relative to the first and by two walls perpendicular to the axis. This enclosure is divided into two chambers by means of two axial partitions, one fixed to the outer wall and the other to the inner wall, and the relative pivoting of these partitions causes the volume of the chambers to vary.

Preferably, the element is formed, at least partially, as a hollow body and one of the cylindrical walls of the rotary jack is formed by the inner face of the element, the other cylindrical wall of the jack being formed by the outer face of the shaft portion.

A simple and lightweight construction is thus obtained.

According to a preferred embodiment, the distributor is a rotary distributor adjacent to one of the walls perpendicular to the axis of the jack and controlled by a low-power motor which can be an electric motor, for example of the "stepping" type.

In this embodiment, the rotary jack is an electro-hydraulic power amplifier.

Advantageously, the shaft portions of the elements are hollow and serve for connecting the jacks to the pressure source and/or to a pressure discharge means.

It will be seen that, since the rotation of a rotary jack is only a little less than 360° at most, the seals can be simplified or even replaced by flexible tubes for the passage from one shaft portion to another.

Preferably, the element is also equipped with a mechanical brake, for example of the disk type, which ensures the relative immobilization of the shaft portion and the element when the appropriate position is reached. Advantageously, this mechanical brake also ensures immobilization in the event of a fall of the fluid pressure and/or of the electrical supply voltage of the motor.

This brake makes it possible to do without high-performance seals for the rotary jack, since this is active only for the brief duration of the movements. The mechanical brake thus makes it possible to save energy when the position is stable for some time, by interrupting the supply of pressure and electricity. Finally, it makes it possible to ensure safety in the event of failure in the fluid or electrical networks.

The type of fluid feeding the jack was not mentioned specifically in the foregoing. It is possible to use a hydraulic jack allowing high powers to be obtained or a pneumatic jack making it possible to simplify the device by omitting the return lines.

The weight reduction achieved by means of the structure just described made it possible to use couplings of simpler design between elements, and thus in turn affording new weight reductions. According to a preferred embodiment, the coupling means between the first element and the second element and the articulated connection between the drive-shaft portions corresponding to these elements are composed, as a whole, of a connection of the cardan type or the like, which allows each element to assume any orientation relative to the other, but does not allow one element to rotate on its own axis when the other element is immobilized, and of a pivot-type connection linking the two drive-shaft portions to one another, this connection having a single pivot axis which meets the axes of the two portions obliquely.

Advantageously, the pivot-type connection is obtained by means of two plates, each carried by a portion and in contact by means of a surface oblique relative to the axis of this portion, these two plates being held against one another because the two portions are each immobilized axially relative to the corresponding element and the elements are immobilised axially relative to one another by means of said cardan-type connection.

As can be seen, this arrangement is the opposite of that described in EP-A-0,153,884. In fact, this document shows the elements coupled to one another in planes oblique relative to their axis, and the shaft portions linked by means of universal (or cardan) joints. The new arrangement makes it possible to do away with these bearings of large diameter, which are therefore heavy, by replacing them with a lighter cardan joint in the region of the coupling between elements, whilst for linking the portions to one another the universal joint can be replaced by simple bearing surfaces of similar weight.

The invention will now be described in more detail by means of practical examples illustrated in the drawings in which:

FIG. 1 is an axial section through an element and part of an adjacent element.

FIG. 2 shows a section perpendicular to the axis of the rotary jack.

FIG. 3 shows a section perpendicular to the axis of the coupling means of the elements.

FIG. 4 is a representation of the manipulator in which the successive elements can be wound spirally.

FIG. 5 shows the series/parallel arrangement of several pairs of elements on a common base, so as to form a gripping hand.

Reference will first be made to FIG. 1.

Two hollow cylindrical bodies 1, 2 each carry two symmetrical fastenings 12a, 12b at one of their ends; these two pairs of fastenings are linked to one another by means of a ring 3 forming a connection element between the two cylindrical elements; each fastening is linked to the ring by means two pivots 13a, 13b, thus providing a cardan joint allowing a pivoting movement of one of the cylindrical bodies relative to the other.

We shall now look at the interior of each of the hollow cylindrical bodies. A shaft 7a, 7b, which is an integral part of a rotary jack forming a paddle-amplifier 6, is mounted without play in the axis of the hollow cylindrical bodies by means of bearings 15, 16, 17. Furthermore, each shaft, at one of its ends, carries a plate 8a, 8b, of which the faces 9 in contact are inclined at an angle of 30° to the axis of the shaft, this value not being mandatory and, at the other end, carries the armature 18 of a disk brake composed of this armature and of an inductive body 19 fastened rigidly to the hollow cylindrical body.

If one of the cylindrical bodies is kept stationary, whilst the other is left free, the rotation of one of the shafts 7a, 7b will cause the free cylindrical body to pivot through a certain angle, the axis of this describing a cone, the apex of which is the point of convergence of the edges of the connection element 3; in fact, the planes of the faces of the plates mounted on the shafts pass through this point of convergence. Moreover, the combined rotational movement of both shafts according to a defined logic will make it possible to orient the axis of the movable cylinder in terms of magnitude and direction in relation to the axis of the stationary cylinder, the maximum angle being determined both by the trace of the cardan joint and the inclination of the face 9.

If the two shafts are blocked in position by means of the disk brakes when the desired angular position has been reached, a rigid joint having a specific angle in a given direction between its two axes is obtained.

On the other hand, if the brake armature of the element 1 is fastened rigidly to the preceding element, the two elements being linked by means of a bearing 10, there will be a rotational movement of the element 1 in its axis relative to the preceding element.

We shall now look at the device for controlling the rotation of these shafts 7a, 7b. The torque necessary for rotating the shaft is obtained by means of a rotary jack (or a hydraulic motor) formed as follows: the working volume is limited, on the one hand, by the inner surface 20 of the hollow cylinder, on the other hand by the shaft 7 and the flange 21 integral with it, and finally by a hydraulic rotary distributor 4 which, depending on its angular position, ensures that pressurized fluid is fed to one or other of the annular chambers, these chambers themselves being limited, on the one hand, by a stationary rectangular blade 6 connected to the cylindrical body and, on the other hand, by a movable rectangular blade 11 connected to the shaft.

The intake of the pressurized fluid occurs via a duct 22 made in the cylindrical casing of the blade and the distributor; the return to the tank takes place via a duct 24 made in the thickness of the rotary distributor, via a groove 25 made in the inner bore of this distributor, and finally by drilling in the shaft 7 two holes, one 26 in the axis of the shaft and the other 27 along a radius of this shaft. One and only one angular position of the shaft 7 will correspond to any annular position of the distributor.

The control of the distributor 4 in terms of rotation is obtained by means of the rotor 14 of a stepping motor coupled directly to it, the stator 5 of this same motor fitting inside the cylindrical element. If rotation through a given angle in a given direction of the stepping motor is commanded, the distributor and also the shaft of the hydraulic jack will describe the same angle.

FIG. 1 shows an articulated module, of which the means for controlling the rotation of the shaft 7a, 7b comprises an electro-hydraulic device of controlled position; of course, any other rotary actuator having sufficient specific power and position accuracy for the use in question may also be used; for example, it is also possible to use a pneumatic jack, thereby affording the advantage of greater simplicity because of the omission of lines for return to the tank.

It will be seen from this same figure that the sealing of the chambers of the bladed hydraulic motor is obtained by means of narrow assembly tolerances and materials with a low coefficient of friction. In the event of high pressure, this sealing can effectively be improved by installing seals or preferably sealing rings 28.

Reference will now be made to FIG. 2. This figure shows once again, in cross section, the cylindrical body 1, the hollow shaft 7, the stationary blade 6 and the movable blade 11. The two blades limit 2 annular chambers, one on the left G and the other on the right D. The pressure duct 22 is closed off by the staionary blade and the return duct to the tank 25 by the movable blade. If the hydraulic distributor is rotated through an angle $\alpha$, the pressure duct moves to 22' and the tank return duct to 25'. The pressure difference between the chambers G and D causes the rotation of the shaft carrying the movable blade until the tank return 25' is closed off, that is to say in the position 11'.

Reference will now be made more specifically to FIG. 3. This section taken in the main plane of the connection element shows the ring 3 which, by means of pivots 13, links the fastenings 12a of the cylindrical body 1 to the fastenings 12b of the cylindrical body 2. The end plates 8a and 8b of the shafts 7a and 7b can also be seen, partially cut away. A rotation of either or both of these shafts causes the rotation of one of the bodies relative to the other along two orthogonal axes 23a and/or 23b.

Reference will now be made to FIG. 4. This shows a manipulation arm in an arrangement similar to that described in the patent EP-A-0,153,884, but in this arm the lengths of the elements of the successive modules 1, 2 increase, thus allowing a spiral winding and hence the possibility of a considerable extension of the arm especially vertically.

Reference will now be made to FIG. 5. It shows another possible configuration of a manipulation arm.

Some of the elements are arranged in series and others in parallel on a base 29, the fastening surface of which would be, for example, a cone of an apex of 120°, the assembly as a whole forming a gripping hand, and the gripping action of the end elements 30a, 30b, 30c can be independent of one another or not. The base 29 can be stationary or can itself form one of the elements of the manipulation arm.

I claim:

1. A manipulation arm comprising a series of articulated elements wherein at least one element is formed at least partially as a hollow body, a successive first and second element of the series each having one axis and being linked to one another by a coupling means allowing the first element to pivot about a pivot axis which meets the axis of the first element and which meets the axis of the second element obliquely at the same point, said first and second elements each having a rigid driveshaft portion within and coaxial relative to the corresponding element, these portions being linked to one another by means of an articulated connection and each being linked to the corresponding element by connection means which make it possible to rotate a portion at will and immobilize it at will in relation to the corresponding element, said connection means comprising a rotary jack, of which one cylindrical wall is formed by the inner face of the element and one axial wall is fixed to the element, the other cylindrical wall being formed by the outer face of the shaft portion and the other axial wall being fixed to the shaft portion, and a distributor capable of connecting a chamber of the rotary jack to a source of pressurized fluid or to a pressure discharge means and of isolating said chamber.

2. The arm as claimed in claim 1, wherein the distributor is a rotary distributor adjacent to one of the axial walls of the jack and controlled by a low-power motor, such as an electric motor, for example of the stepping type.

3. The arm as claimed in claim 1, wherein the shaft portions of the elements are hollow and serve for connecting the jacks to a pressure discharge means.

4. The arm as claimed in claim 1, wherein the element is also equipped with a mechanical brake which ensures the relative immobilization of the shaft portion and the element when the appropriate position is reached.

5. The arm as claimed in claim 4, wherein the mechanical brake also ensures the relative immobilization of the element and the shaft portion in the event of a fall of fluid pressure or electrical voltage of the motor.

6. The arm as claimed in claim 1, wherein the coupling means between the first element and the second element and the articulated connection between the drive shaft portions corresponding to these elements are composed, as a whole, of a connection of the cardan type or the like, which allows for each element to assume any orientation relative to the other, but does not allow one element to rotate on its own axis when the other element is immobilized, and of a pivot-type connection means which links the two drive-shaft portions to one another, said connection means being pivotable along a single pivot axis which meets the axes of the two portions obliquely.

7. The arm as claimed in claim 6, wherein the pivot-type connection means is obtained by means of two plates each carried by a portion and in contact by means of a surface oblique relative to the axis of this portion, these two plates being held against one another because the two portions are each immobilized axially relative to the corresponding element and the elements are immobilized axially relative to one another by means of the said cardan-type connection.

8. The arm as claimed in claim 1, wherein at least some of the connection elements are of a length increasing in the series.

9. The arm as claimed in claim 1, further comprising additional articulated elements wherein some of said additional articulated elements are arranged both in parallel and in series on a base attached to said arm so that said elements are capable of providing a gripping action.

* * * * *